Feb. 20, 1962  J. TJAARDA  3,022,105
COMPOSITE AUTOMOBILE DESIGN
Filed Sept. 21, 1959  3 Sheets-Sheet 2

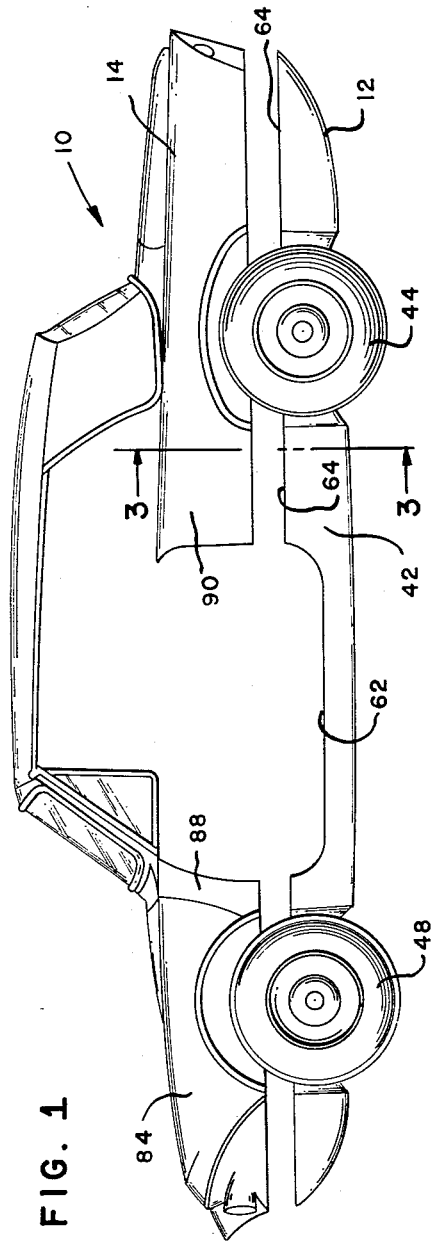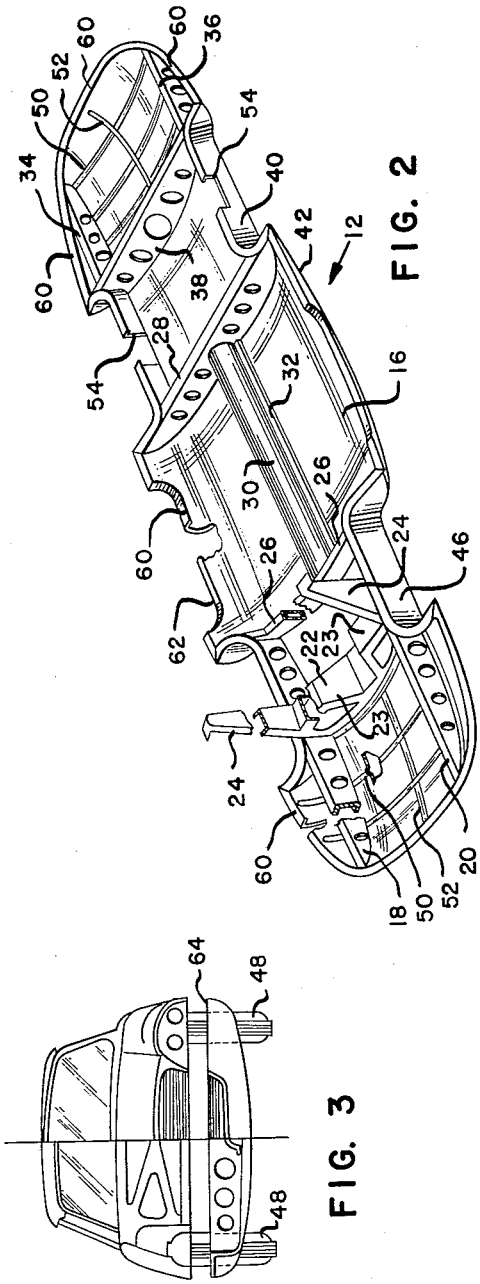

INVENTOR.
JOHN TJAARDA
BY
WILSON, LEWIS & McRAE
ATTORNEYS

Feb. 20, 1962 J. TJAARDA 3,022,105
COMPOSITE AUTOMOBILE DESIGN
Filed Sept. 21, 1959 3 Sheets-Sheet 3

INVENTOR.
JOHN TJAARDA
BY
WILSON, LEWIS & McRAE
ATTORNEYS

United States Patent Office 3,022,105
Patented Feb. 20, 1962

3,022,105
COMPOSITE AUTOMOBILE DESIGN
John Tjaarda, 78349 Kidder Lane, Romeo, Mich.
Filed Sept. 21, 1959, Ser. No. 841,100
7 Claims. (Cl. 296—28)

This invention relates to automotive vehicle structures, and particularly to an improved method and structure for materially reducing the cost of vehicle body manufacture.

In the conventional automotive vehicle there is provided a rather heavy chassis or frame construction for supporting the automotive vehicle body. During the manufacturing operation the chassis is moved along an assembly line to incorporate the body components thereon, such body components comprising the fender panels, grille, hood, cowling and windshield assembly, quarter panels, roof, rear windshield cross brace, rear deck panel, deck lid, etc.

The costs for chassis and body components make up a considerable percentage of the manufacturing costs of the vehicle, as regards die costs, material costs, weight considerations, design time, and manufacturing floor space requirements. Under the present invention it is proposed to utilize an underbody structure design which can be employed over several model years without hampering design changes, thereby saving considerably on total manufacturing costs.

It should be noted that the major changes in design of automobiles over the last ten years have taken place in the area above the wheel center line, and the appearance features below the wheel center line have not changed to any considerable degree. However, the conventional methods of designing the vehicle chassis, underbody and superstructure are such that it has not been heretofore possible to conveniently redesign the upper structure without also making substantial changes in the underbody design and chassis design.

Under the present invention it is proposed to provide a pontoon-like underbody construction forming a substantially horizontal upper edge area or base line at approximately the level of the wheel center line, the arrangement being such that sectionalized superstructure components can be disposed on this upper edge area to form the complete body. In this manner the same underbody construction can be utilized for several successive model years, and styling changes can be effected by suitable redesign of the superstructure body components. Since the costs of changing the unnderbody structure each model year will be eliminated, the total cost for each model changeover should be considerably reduced, perhaps as much as fifty percent. Also, since the design problems will be considerably simplified for each model year, the development time or "Lead" time will be considerably reduced from the present period of approximately three years to a contemplated period of one year or less. In this manner the manufacturer will be enabled to display his most appealing product to the public.

As previously pointed out, the conventional vehicle construction requires a relatively heavy chassis construction, with a considerable number of welding operations being required to mount the superstructure components thereon. Because of these welding operations, it is not feasible to paint the components prior to their assembly onto the underbody and chassis construction. Considerable savings can be made by equipping the sub-assemblies with their electrical components and painting them prior to their being assembled in the main assembly line. Under the present invention the employment of a pontoon-like underbody defining a horizontal edge area or base line above the center line of the wheels will reduce the weight of the superstructure components, and will rigidify the body sufficiently to eliminate the necessity for welding. As a result, it will be possible to assemble the accessory mechanisms into each superstructure component and paint the component prior to incorporation therewith on the main assembly line. Use of this concept will enable the manufacturer to diversify his operations by assembling fully painted components in several smaller plants located at selected geographical locations. The smaller and lighter components of the present invention can of course be handled or shifted aobut more easily than the conventional components.

The "pontoon-like" character of the underbody as proposed under the present invention has a further value in its protection of the vehicle occupants, it being appreciated that the upwardly dished portions of the pontoon unit encircle the occupants and protect them in the event of collision. In effect the occupants are seated partially within the underbody structure rather than above the underbody structure as in the conventional construction, and the result is an improved safety factor in the event of collisions, either head-on collisions or side collisions.

With the above discussion in mind, it is a principal object of the invention to provide a method and structure for producing a high strength vehicle body at relatively low cost.

More particulraly it is an object of the invention to provide a vehicle body comprised of a pontoon-like underbody structure defining a horizontal base line at or adjacent the wheel center line, together with sectionalized superstructure components mounted on said base line, the arrangement being such that the same underbody design can be employed over a number of model years while still permitting styling changes through variation in configuration of the superstructure components.

A further object of the invention is to provide a vehicle body having the desired features of sturdiness and lightness, as well as low total overall height for styling advantages and low center of gravity advantages.

An additional object is to provide a vehicle body construction requiring no welding after assembly of the superstructure components, the advantage residing in the fact that the components can be painted and outfitted with hardware prior to their final disposition on the underbody structure.

An additional object of the invention is to provide a sectionalized vehicle body structure wherein different materials such as steel, aluminum, reinforced fiberglass or other plastics can be employed for different ones of the vehicle body components, without galvanic corrosion, weak connections or other deleterious effects on the performance of the assembly.

A further object of the invention is to provide a vehicle body construction including an underbody wherein the seat occupants are situated partially within the underbody so as to be shielded from collision forces.

A further object of the invention is to provide a vehicle body design wherein the cost and time required to effect yearly styling changes are considerably reduced.

A still further object of the invention is to provide an underbody structure of novel dish-like configuration, the purpose being to lighten and stiffen the understructure.

Another object is to provide a vehicle body construction having an improved safety factor for the vehicle occupants.

Other objects of this invention will appear in the following description and appended claims, reference being had to the accompanying drawings forming a part of this specification wherein like reference characters designate corresponding parts in the several views.

In the drawings:

FIG. 1 is a side elevational view illustrating one embodiment of the invention, with the superstructure components disassociated from the understructure components to illustrate the "base line" character of the joining surface between the understructure and upper structure;

FIG. 2 is a perspective view of the understructure utilized in the FIG. 1 embodiment;

FIG. 3 is a view taken partly as a front elevation of the FIG. 1 embodiment and partly as a section on line 3—3 in FIG. 1;

Figure 4:
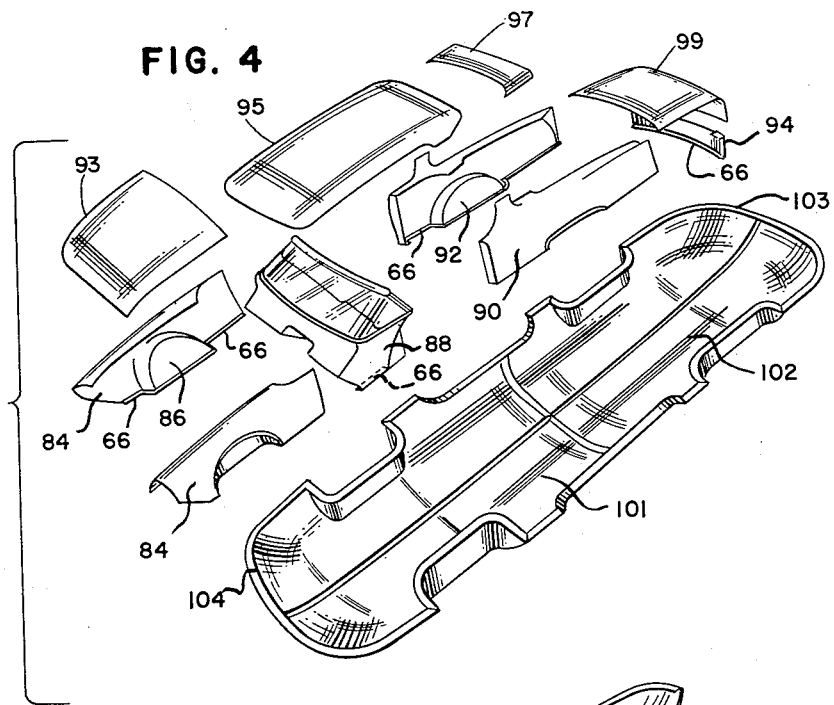
FIG. 4 is an exploded view of an automotive vehicle body employing the same superstructure as the FIG. 1 embodiment but utilizing a different type of underbody structure.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring to the drawings, and particularly FIGS. 1 through 3, there is shown an automotive vehicle 10 comprising an underbody structure 12 and an upperbody structure 14.

Structure 14 is preferably formed as a series of connected sections of the type shown in FIG. 4, the exact configuration, size and arrangement of each section depending on such factors as vehicle size, vehicle weight, styling, engine placement, etc. The materials for structures 12 and 14 may be varied, depending on design considerations and cost considerations. Illustrative materials are steel, aluminum and reinforced plastics.

Underbody structure 12 includes a generally egg-shaped or pontoon-shaped skin structure 16 carried on reinforcement members extending longitudinally and laterally of the skin structure.

The reinforcement members include two generally channel-shaped cross sectioned braces or side rails 18 and 20 extending from the forward portion of the skin structure 16 past brace 22. Brace 22 includes two box sections 23 having the upstanding channel-shaped risers 24 extending from their opposite ends for mounting of structure 12 on the conventional front vehicle springs (not shown). Rails 18 and 20 are welded to brace 22 at their intermediate portions and are welded to a bulkhead 26 at their rear portions. Bulkhead 26 may be constructed as a box section as shown or other configurations as desired. A second bulkhead is provided at 28, and a tunnel-forming shroud 30 is extended between the two bulkheads 26 and 28 for containment of the drive shaft and also for rigidification of the understructure 12. In this connection it will be noted that the tunnel structure is formed with flange portions 32 which are welded to the skin structure 16 for rigidifying purposes.

Disposed rearwardly of bulkhead 28 are two channel-shaped rails 34 and 36 having their forward end portions welded to a bulkhead 38. It will be noted that the portions 40 of the skin structure 16 are indented from the side portions 42, whereby to accommodate the rear wheels 44 of the vehicle. Similarly, portions 46 of the skin structure are indented from side portions 42 to accommodate the front wheels 48 of the vehicle.

The skin structure may be reinforced by the transverse ribs 50 and/or longitudinal ribs 52, the arrangement being such that the longitudinal rails and transverse bulkheads cooperate therewith in forming a relatively high strength, lightweight underbody structure. The structure illustrated in FIG. 2 is particularly suited for front end mounting of the power unit in the space forwardly of bulkhead 26, with the drive shaft extending within tunnel 30 and the transmission disposed between bulkhead 28 and 38. Cutouts are provided at 54 for accommodating the rear axle. It is contemplated that utilization of the ribbed skin structure reinforcing rail arrangement could also be employed in a rear engine mounted vehicle.

It will be noted from FIG. 2 that the upper edge portions of skin structure 16 are provided with inturned flanges at 60, said inturned flanges extending entirely around the periphery of the skin structure except for the edge portions defined by cutout 54. By reference to FIG. 1 it will be seen that, with the exception of the areas 62 for the vehicle doors, the upper edge of the underbody structure 12 is substantially flat so as to define a base line 64. Thus, the flanges 60 at the portions forwardly and rearwardly of the passenger compartment are on the same plane 64 to define a base surface for mounting of the superstructure 14. By recessing the skin structure downwardly at 62 the vehicle floor (not shown) can be disposed at a relatively low level to obtain a low center of gravity and to enable the vehicle occupants to move easily into and out of the vehicle. At the same time the base line 64 can be disposed at a relatively high level so that the materials required for superstructure 14 can be reduced as compared with the conventional arrangement. In this connection it will be recalled that one object of the present invention is to provide a vehicle design wherein the same understructure can be retained over successive model years, with ornamental design changes being effected in the superstructure. By maintaining the superstructure materials as small as possible the features of the invention relating to lowered die cost, and lowered handling costs will be achieved.

Figure 9:
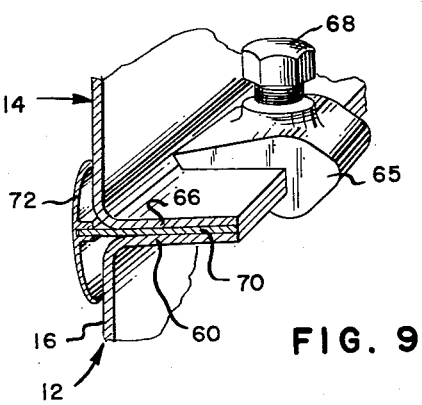
FIG. 9 is a perspective view of a connector means which can be employed with the structures shown in FIGS. 1 through 8.
Figure 10:
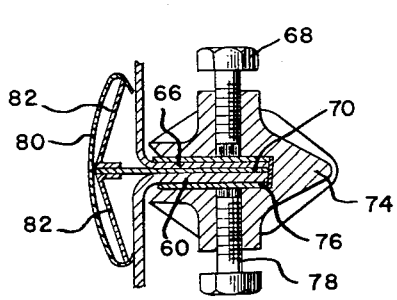
FIG. 10 is a sectional view taken through another connector means which can be employed in lieu of the FIG. 9 connector means.

Although the understructure is formed separately from superstructure 14, yet the arrangement of flanges 60 and the clamping structures shown in FIGS. 9 and 10 is such as to rigidly lock the understructure and superstructure together for providing high strength body assembly. Referring to FIG. 9, it will be noted that a clamp 65 is provided for securement of the underbody structure 12 to the upperstructure 14. The upperstructure components are preferably formed with inturned flanges 66 which mate with the flanges 60 formed on the understructure, and clamp 65 is fitted onto the flanges 60 and 66 for securing the body components together. A bolt 68 is threaded through the upper portion of the clamp to exert a compressive force on the flanges 66, and a similar bolt (not shown) in FIG. 9 is threaded upwardly through the lower portion of the clamp 65 to exert a compressive force against flange 60. The number of clamps may be varied, depending on the size of the vehicle.

Clamps 65 are not relied on entirely to secure the body sections together. Reliance is also placed on an adhesive-covered strip 70 interposed between the two flanges 60 and 66. Strip 70 is preferably of plastic material to retard galvanic corrosion which would otherwise take place when sections 12 and 14 are constructed of different metals, such as steel and aluminum. Strip 70 may also be formed of other materials such as zinc-coated material or galvanized iron. The adhesive may be varied to suit different conditions, suitable adhesive being epoxy resins, neoprene rubber base adhesives and phenol acetal resins. The clamps provide a good pressure engagement of the flanges 66 and 60 with the adhesive coated strip 70 so as to ensure a rigid uniting of the upperstructures with understructure 12. Strips 70 can have the ornamental trim strips 72 if desired.

The FIG. 9 clamp is constructed of plastic material in order to retard galvanic corrosion. However the clamp could be constructed of metallic material as shown at 74 in FIG. 10, in which case a channel-shaped plastic strip 76 is fitted within the clamp to prevent the clamp from contributing to a glavanic corrosion effect. Also, the adhesive impregnated strip 70 is again employed to cooperate with the clamping action of the upper screw 68 and the lower screw 78 in forming a high strength connection between the body panel flanges as shown in FIG. 10. The molding or trim strip can be formed as a separate element 80 and connected to strip 70 by the spring fingers 82.

FIGS. 9 and 10 show specific types of clamps for connecting the body panels together. However it will be appreciated that other means such as bolting, riveting or welding can be employed to rigidly interconnect the panels. The use of clamps and adhesives is preferred because of the advantages of freedom from rattle, and adaptability to painting before assembly.

Referring to FIG. 4, the superstructure of the illustrated vehicle will be seen to include a pair of front fender panels 84 having the flanges 66 and the wheel casing structures 86. Disposed rearwardly of panels 84 is the cowl-windshield assembly 88 which is provided with additional flange portions 66 at its lower ends for connection with portions of the flanges 60 as previously explained. Disposed rearwardly of the assembly 88 are the rear fender or quarter panel assemblies 90 having the wheel cases 92 and the inwardly extending flange portions 66 for rigid connection with the understructure shown in FIG. 2. The illustrated superstructure is completed by a hood 93, roof panel 95, rear windshield cross brace 97, deck lid 99, and rear end panel 94.

The FIG. 2 understructure is of generally pontoon-like configuration so as to provide a relatively high strength assembly, even without the reinforcing members 18, 20, 22, 26, 28, and 30. Also, the pontoon-like character of the understructure enables the vehicle occupants to be seated partially within side portions of the understructure so that a collision is less likely to deform the vehicle sufficiently to cause extensive injury to the vehicle occupants.

Figure 8:
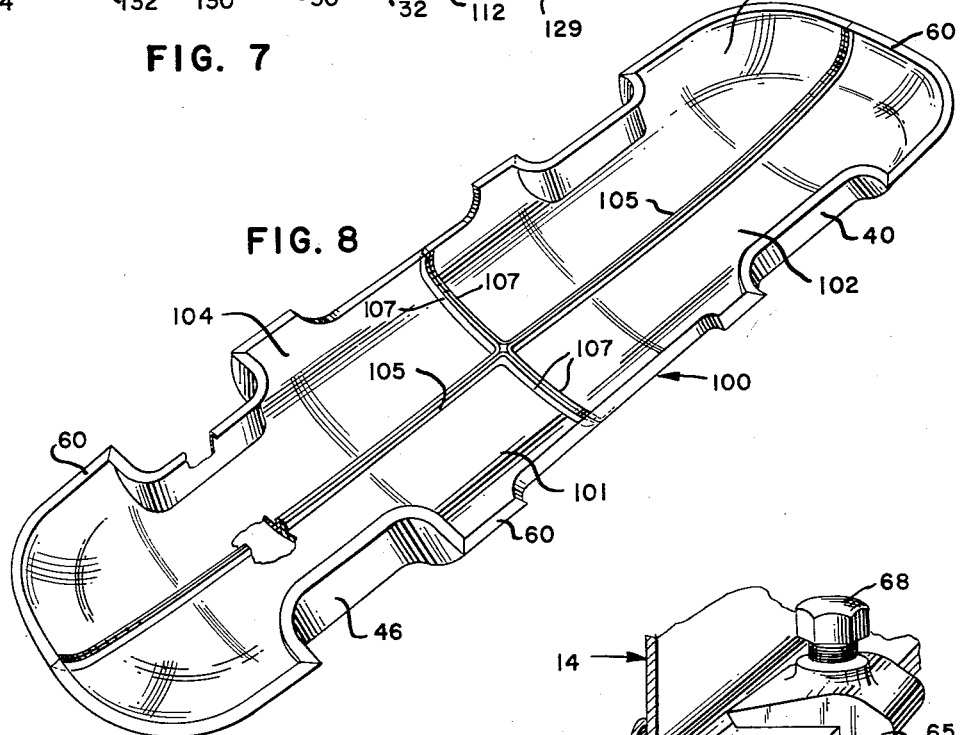
FIG. 8 is an enlarged perspective view of the underbody structure shown in FIG. 4.

The FIG. 2 understructure utilizes separate longitudinal and transverse bracing members in addition to the skin structure 16. However, it is contemplated that the longitudinal and transverse reinforcement features can be incorporated integrally with the skin structure, as for example shown in FIGS. 4 and 8. Thus, referring to FIG. 8, there is provided a sectionalized understructure 100 formed of four separate panels 101, 102, 103, and 104. Each of the panels forms substantially one-quarter of the underbody assembly, and each of the panels is provided with upstanding flange portions 105 and 107 (in addition to the flange portions 60). As shown in FIG. 8, panels 101 through 104 are assembled together with their upstanding longitudinal flanges 105 engaged with one another and with their transverse flanges 107 engaged with one another. The panel components can be connected together by bolting through these flanges 105 and 107, welding along the flanges, or by adhesive-clamp means as shown in FIGS. 9 and 10. The panels can be formed as stampings, aluminum die castings or of reinforced structural plastics.

Within the broader aspects of the invention the understructure 100 can be formed as a single stamping (without the connecting flanges 105 and 107). However, it is preferred to form the understructure as a sectionalized unit as shown in FIG. 8 in order to permit changeover from one wheel base to another with a minimum tooling expenditure. Thus, by employing the FIG. 8 sectionalized understructure the wheel base can be shortened or lengthened by merely replacing the two rear sections or the two forward sections with corresponding sections of different length. An additional method of changing the wheel base involves merely adding inserts between the front sections and the rear sections. The inserts would, of course, be of dish-like configuration in the transverse direction and would be provided with flanges at their front and rear edges similar to the flanges 107 shown in FIG. 8.

Figure 5:
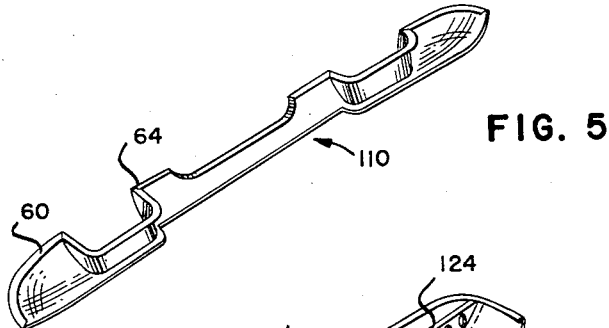
FIG. 5 is a perspective of a body component utilized with the FIG. 6 understructure.
Figure 6:
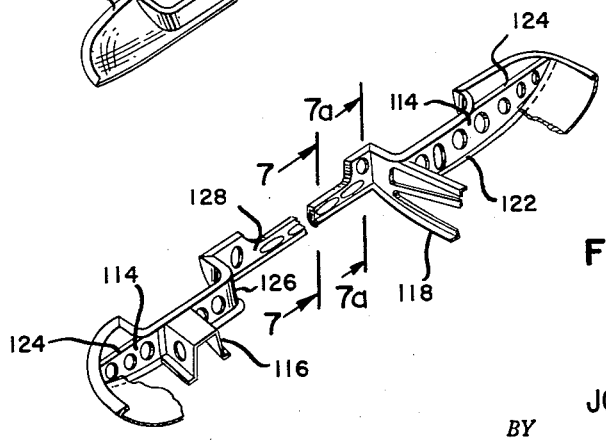
FIG. 6 is a fragmentary perspective view showing a portion of an underbody construction of the present invention.
Figure 7:
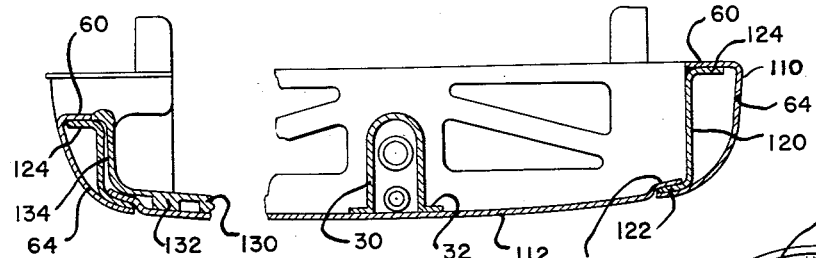
FIG. 7 is a view with the left hand portion thereof taken as a section on line 7—7 in FIG. 6, and with the right hand portion thereof taken as a section on line 7a—7a in FIG. 6.

In the underbody structures shown in FIGS. 2 and 8 the upturned side portions of the pontoon-like skin structures are formed integrally with the central bottom panel portions of the skin structures. However, it is not necessary that the bottom sheath portion or underpan as it is conventionally termed be formed integrally with the upturned side portions. Thus, there is shown in FIGS. 5, 6, and 7 an underbody construction of the invention wherein the side portions 110 of the underbody are formed separately from the pan portion 112 (FIG. 7). The portions 112 and 110 are secured to a separate frame structure comprised of the side rails 114 and the transverse bulkheads 116 and 118. The side rails 114 are formed by upright web portions 120 and oppositely extending flange portions 122 and 124 at their upper and lower edges. The front portion of each rail 114 extends beyond the front wheel area and then turns outwardly at 126. The central portion of each rail 114 is disposed outwardly of the front and rear end portions to provide a passenger compartment of maximum width, the arrangement being such that the passengers are disposed partially within the side rails to provide an increased safety factor. The front and rear portions of each side rail 114 are disposed inwardly of the central portion 128 to accommodate the front and rear wheels.

It will be understood that the frame structure defined by rails 114 and transverse braces 116 and 118 is preferably assembled prior to assembly of the side panels 110 therewith. The side panels are provided with the inwardly extending flanges 60 at their upper edges, with the flanges forming a substantially flat base line 64 similar to the base line previously described, the arrangement being such that the superstructure (not shown in FIGS. 5, 6, 7) can be assembled onto the FIG. 7 understructure after painting. The underpan 112 is preferably provided with the off-set edge portions 129 as shown in FIG. 7 to mount it on the flange portions 122 of the side rails 120 by welding, riveting, adhesives, or other means. The floor portion of the vehicle can be formed in numerous different ways, but as shown in FIG. 7 the floor can be formed as a molded element 130 having the integral reinforcement ribs 132 and the upstanding side portions 134.

With each of the illustrated arrangements there is obtained the feature of a pontoon-like understructure defining a substantially flat base line on which the superstructure components can be mounted. The advantage in this arrangement is that it permits the same tooling to be employed for the understructure during several successive model years. As a result tooling and design costs are considerably reduced. Also, the time period required to proceed from the drawing stage to the production stage is considerably reduced from the conventional two or three years time. In this manner the manufacturer will be enabled to display his most advanced product to the public each year, since styling changes can be incorporated in the superstructure and with substantially lesser design changes than are involved in a complete redesign of the sheet metal work.

The "pontoon-like" character of the underbody structure is advantageous in that a relatively high strength construction is formed by a unit of given weight. This is in contrast to the conventional substantially flat chassis structures which do not have the dished or egg-shaped configuration and which do not develop the equivalent strength of the egg-shaped unit illustrated. The illustrated unit can be formed of relatively light materials so as to further reduce costs and vehicle dead weight; as an additional advantage the reduction in weight will permit a lower horsepower driving unit.

It will be noted that the superstructure is preferably of a sectionalized type, with the components thereof having the flanges 66 for rigid securement to the understructure. The sectionalizing of these upperstructure components will not materially reduce their strength, while an advantage is obtained due to the fact that each superstructure component can be painted and equipped with its electrical wiring and other hardware prior to association with the understructure. In this manner the components can be manufactured and equipped at different locations throughout the country. Because the sectionalized superstructure components are relatively small they will be easier to handle, and shipment and cost savings will be attained.

The drawings illustrate a two-door vehicle but it will be appreciated that the invention can equally well be applied to a four-door construction, in which case the doorway area 62 is preferably widened and a pillar structure installed therein to define two separate doorways in the conventional manner.

While specific structural features have been shown in the drawings and described herein it will be appreciated that modifications thereof may be resorted to without departing from the spirit of the invention as defined in the appended claims.

I claim:

1. A vehicle body comprising an underbody structure including an elongated lower panel structure, and an upstanding peripheral wall structure rigid therewith; the upstanding peripheral wall structure extending substantially completely around the periphery of the lower panel structure and terminating a substantial distance thereabove to provide a substantially flat horizontal flange defining a substantially horizontal base line; said upstanding peripheral wall structure having a vertical dimension such that the base line is located between the wheel center line and the upper peripheral edge of the wheel so that the underbody structure forms a substantial portion of the viewable vehicle body; the combination further comprising a sectionalized upperbody structure carried on said flange at said base line and extending thereabove; said sectionalized upperbody structure including a cowl-windshield assembly located centrally above the underbody structure and mounted on said flange along portions of the base line located centrally along opposite sides of the vehicle body, separate left and right front fender panel assemblies extending forwardly from the cowl-windshield assembly and mounted on said flange along forward portions of the base line; separate rear fender panel assemblies disposed rearwardly of the cowl-windshield assembly and disposed on rear portions of said flange along said base line along opposite sides of the vehicle body; the sectionalizing of the upperbody structure permitting the various assemblies to be outfitted with hardware and painted prior to their assembly together and disposition on the underbody structure, and the formation of the underbody structure to define a base line at the claimed level serving to enable the appearance of the vehicle to be changed by reconfiguring of the upperbody structure assemblies without need for reconfiguring of the underbody structure.

2. The combination of claim 1 wherein different ones of the underbody structure and upperbody structure assemblies are formed of dissimilar metallic materials; the combination further comprising means located in the joints between the dissimilar metallic parts to prevent galvanic corrosion.

3. The combination of claim 1 wherein the upperbody structure assemblies are secured to the underbody structure with adhesives, thereby eliminating the need for welding operations as would injure the assemblies when installed as pre-painted units.

4. The combination of claim 2 wherein the underbody structure is formed by a series of separately-formed connected substantially flat lower panels, each having integrally formed upstanding flange means thereon, and said lower panels being arranged with the upstanding flange means thereof in contiguous relationship so as to define the aforementioned peripheral wall structure; the formation of the underbody structure as a series of connected separately formed panels permitting the underbody structure to be lengthened by the addition of other panels thereto.

5. A vehicle body comprising an underbody structure including an elongated lower panel structure, and an upstanding peripheral wall structure rigid therewith; the upstanding wall structure extending substantially completely around the periphery of the lower panel structure to provide a substantially horizontal flange to define a horizontal base line; the vertical dimension of the peripheral wall structure being such that said flange defining said base line is located just above the wheel center line so that the underbody structure forms a substantial portion of the viewable vehicle body; the combination further comprising a sectionalized upperbody structure, including a cowl-windshield assembly positioned centrally above the underbody structure between its front and rear ends, with portions thereof supportably seated on portions of said flange at said base line, two front fender panel assemblies positioned on portions of said flange at said base line forwardly of the cowl-windshield assembly, and two rear fender panel assemblies located along opposite sides of the vehicle body on said flange at said base line in rearwardly spaced relation to the cowl-windshield assembly; the portions of the underbody peripheral wall structure located beneath the spaces between the cowl-windshield assembly and rear fender panel assemblies being depressed below the general level of the base line so as to accommodate the lower portions of vehicle doors.

6. A vehicle body comprising a pontoon-shaped underbody including an elongated bottom panel and a peripheral upstanding wall means extending therefrom to provide a flange defining a flat base line; said peripheral wall means having a substantial vertical dimension so that the underbody forms a substantial portion of the viewable vehicle body; a sectionalized upperbody positioned atop the underbody and including a cowl-windshield assembly positioned between the front and rear limits of the underbody and having side portions thereof supported on said flange of said underbody at the base line, two front fender panel assemblies extending along opposite front side areas of the vehicle body in supported positions on said flange at the flat baseline, and two rear fender panel assemblies extending along opposite rear side areas of the vehicle body behind the cowl-windshield assembly in supported positions on said flange at the base line.

7. The forming of a vehicle body comprising forming an underbody with an upstanding peripheral wall area extending substantially around the entire periphery thereof for a substantial vertical extent; forming a cowl-windshield assembly, equipping same with hardware, painting same and installing same in supported position on centrally located side areas the underbody peripheral wall area; forming front fender panel assemblies, equipping same with hardware, painting same, and then installing same in supported positions on front side areas of the underbody peripheral wall area; and forming rear fender assemblies, equipping same with hardware, painting same, and then mounting same in supported positions on rear side areas of the underbody peripheral wall area.

(References on following page)

References Cited in the file of this patent

UNITED STATES PATENTS

| | | | |
|---|---|---|---|
| 1,143,987 | Nelson | June 22, | 1915 |
| 1,483,650 | Corbin | Feb. 12, | 1924 |
| 1,630,145 | Travis | May 24, | 1927 |
| 1,822,775 | Henninger | Sept. 8, | 1931 |
| 2,007,134 | Rosenberg | July 2, | 1935 |
| 2,192,075 | Gregoire | Feb. 27, | 1940 |
| 2,242,269 | Siebler | May 20, | 1941 |
| 2,637,592 | Karlby | May 5, | 1953 |

FOREIGN PATENTS

| | | |
|---|---|---|
| 712,956 | Great Britain | Aug. 4, 1954 |
| 717,951 | Great Britain | Nov. 3, 1954 |
| 736,131 | Germany | June 7, 1943 |
| 852,494 | France | Oct. 30, 1939 |
| 866,760 | Germany | June 7, 1943 |
| 934,628 | Germany | Nov. 3, 1955 |
| 940,185 | France | May 10, 1948 |